US009580252B2

(12) United States Patent
Yokobayashi et al.

(10) Patent No.: US 9,580,252 B2
(45) Date of Patent: Feb. 28, 2017

(54) TRANSPORT APPARATUS

(71) Applicant: NISSEI ASB MACHINE CO., LTD., Nagano (JP)

(72) Inventors: Kazuyuki Yokobayashi, Nagano (JP); Shuichi Ogihara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 14/974,344

(22) Filed: Dec. 18, 2015

(65) Prior Publication Data

US 2016/0101946 A1    Apr. 14, 2016

Related U.S. Application Data

(63) Continuation of application No. PCT/JP2014/066322, filed on Jun. 19, 2014.

(30) Foreign Application Priority Data

Jun. 21, 2013  (JP) .................................. 2013-130738

(51) Int. Cl.
*B65G 47/244* (2006.01)
*B29C 49/42* (2006.01)
*B29C 49/06* (2006.01)

(52) U.S. Cl.
CPC ........ *B65G 47/244* (2013.01); *B29C 49/4205* (2013.01); *B29C 49/06* (2013.01); *B29C 2049/4231* (2013.01); *B65G 2201/0244* (2013.01)

(58) Field of Classification Search
CPC .......... B65G 47/244; B65G 2201/0244; B29C 49/205; B29C 49/06; B29C 2049/4231

USPC ....................................................... 198/377.1
See application file for complete search history.

(56) References Cited

U.S. PATENT DOCUMENTS

| 3,618,743 A | * | 11/1971 | Benatar | .................... | B65B 35/58 |
| | | | | | 198/384 |
| 4,428,474 A | * | 1/1984 | Gau | ........................ | B65C 9/067 |
| | | | | | 198/376 |
| 5,058,724 A | * | 10/1991 | Hinton | .................... | B65C 9/067 |
| | | | | | 198/376 |

(Continued)

FOREIGN PATENT DOCUMENTS

| FR | 2736299 A1 | * | 1/1997 | ......... B29C 49/4205 |
| JP | 8-504699 | | 5/1996 | |

(Continued)

OTHER PUBLICATIONS

International Search Report, from PCT/JP2014/066322, Sep. 16, 2014.

*Primary Examiner* — Mark A Deuble
(74) *Attorney, Agent, or Firm* — David L. Hoffman; Hoffman Patent Group

(57) ABSTRACT

A transport apparatus (300) for transporting a preform (200) for blow molding comprises: a transport device that transports the preform while allowing the preform to rotate on its axis in a horizontal direction; and an engaging device (310) that engages the preform being transported while being allowed to rotate on its axis, and setting the orientation of the preform to a predetermined orientation. The engaging device engages a convexity or a concavity provided in the outer periphery of the preform.

8 Claims, 5 Drawing Sheets

(56) References Cited

U.S. PATENT DOCUMENTS

| | | | | |
|---|---|---|---|---|
| 5,404,227 | A | * | 4/1995 | Sumita ................... B07C 5/126 198/343.1 |
| 5,681,521 | A | | 10/1997 | Emmer |
| 6,308,816 | B1 | * | 10/2001 | Bankuty ................ B65C 9/065 198/377.1 |
| 7,497,323 | B2 | * | 3/2009 | Davidson ................. B65C 9/04 198/474.1 |
| 2007/0042074 | A1 | * | 2/2007 | Graetz et al. ....... B29C 49/4205 425/534 |
| 2009/0014281 | A1 | * | 1/2009 | Eder ........................ B65C 3/16 198/377.1 |
| 2011/0127141 | A1 | | 6/2011 | Zoppas |

FOREIGN PATENT DOCUMENTS

| | | |
|---|---|---|
| JP | 2000-202899 | 7/2000 |
| JP | 2006-062136 | 3/2006 |
| JP | 2011528629 | 11/2011 |
| WO | 2010007159 | 1/2010 |
| WO | 2013027692 | 2/2013 |

* cited by examiner

TRANSPORT APPARATUS

CROSS REFERENCE TO RELATED APPLICATION(S)

This application is a Continuation of PCT International Application No. PCT/JP2014/066322, filed on Jun. 19, 2014, which claims priority under 35 U.S.C. 119(a) to Patent Application No. 2013-130738, filed in Japan on Jun. 21, 2013, all of which are hereby expressly incorporated by reference into the present application.

TECHNICAL FIELD

This invention relates to a transport apparatus.

BACKGROUND ART

As a blow molding apparatus in which a preform is disposed in a blow cavity mold and blow-molded into a container, there has been known an injection stretch blow molding apparatus operated by a so-called 1.5 stage process (see, for example, Patent Document 1). The injection stretch blow molding apparatus by the 1.5 stage process adopts a 1 stage process connecting an injection molding section and a blow molding section inline, but has the advantage of a 2 stage process in which the number of products simultaneously injection molded and the number of products simultaneously blow molded are inconsistent.

Such a blow molding apparatus is provided with a transport line for transporting the preforms continuously. The transport line, for example in Patent Document 1, has a plurality of sprockets, a plurality of transport members capable of engaging the plurality of sprockets for holding the preforms, and a guide rail for guiding the transport members along a transport direction.

If the shape of the container is a uniform shape in a diametrical direction, such as a nearly circular shape in a plan view, the preform is also of a uniform shape nearly circular in a plan view. Depending on the shape of the container, however, there may be a case where the shape of the preform is not uniform in the diametrical direction of the preform, for example, a case in which the preform is elliptical in a plan view, or a case in which the thickness of the preform is not uniform. Such a preform is used, for example, in molding a flat container or a square-shaped container.

When the flat container is to be molded by the so-called 2 stage process, it is necessary to impart a heat distribution to the preform in its major-axis direction, and a heating technique, for example, as in Patent Document 2, is used.

PRIOR ART DOCUMENTS

Patent Documents

Patent Document 1: WO2013/027692
Patent Document 2: JP-T-8-504699

SUMMARY OF THE INVENTION

Problems to be Solved by the Invention

With the technique concerned with Patent Document 2, however, control is complicated, or the device involved is itself expensive. Since the preform is heated from a room temperature state, moreover, the use of the preform, if partly thick-walled in the diametrical direction, is a disadvantage from the aspect of energy.

On the other hand, a blow molding apparatus employing the 1 to 1.5 stage process, as in Patent Document 1, can utilize so-called potential heat, heat remaining in the preform after injection molding. The value of this potential heat is greater in the part having a thicker wall. That is, simply by thickening side parts of the preform corresponding to the parts across the major diameter of the container, without adopting a special heating technique, a flat container with a uniform wall thickness distribution can be molded. Furthermore, the effective use of the potential heat inherent in the preform is believed to bring advantage to the 1 to 1.5 stage process over the 2 stage process in terms of energy.

In this case, the blow molding apparatus according to the 1.5 stage process requires that in conformity with the major diameter and minor diameter of the blow cavity molds, the preforms need to be brought into an aligned state in which the preforms are aligned with the orientations of the major and minor diameters.

With the device of Patent Document 1, however, the preforms held by the transport members are not tightly fitted to the transport members. Because of vibrations associated with transport, therefore, the preforms rotate with respect to the transport members, and the orientations of the preforms being transported may deviate. If the preforms are in an elliptical shape, for example, the major axis direction of the preforms being transported may deviate.

In such a situation, a misaligned state occurs in which the orientations of the respective preforms being transported are nonuniform. If a blow molding step is performed in this state, the problem arises that desired blow molding cannot take place.

Such a problem is common to a case where the preforms are of a uniform shape in the diametrical direction of the preforms, and a case where blow molding is to be performed, with the preforms being oriented in the same direction.

The present invention has been accomplished to solve the foregoing problems of the conventional technologies. It is an object of the invention to provide a transport apparatus which can align the orientations of the preforms with the same orientation during continuous transport.

Means for Solving the Problems

The transport apparatus of the present invention is a transport apparatus for transporting a preform for blow molding, comprising: a transport device that transports the preform while allowing the preform to rotate on an axis thereof in a horizontal direction; and an engaging device that engages the preform being transported while being allowed to rotate on the axis thereof, and setting the orientation of the preform to a predetermined orientation, wherein the engaging device engages a convexity or a concavity provided in the outer periphery of the preform.

In the present invention, the transport apparatus is equipped with the engaging device which engages the preform being transported while being allowed to rotate on the axis thereof, and sets the orientation of the preform to the predetermined orientation. As a result, each preform can be oriented in the same direction during continuous transport.

Preferably, the engaging device has a rolling member, the rolling member is configured to be capable of moving in a groove part formed in the transport apparatus, and the groove part has, at a predetermined position, a retreat area formed so that the relative distance between the engaging device and the preform lengthens. Since the retreat area is formed, the engaging device can be configured to become separable from the preform easily. Consequently, the preforms can be oriented more accurately in the same direction during continuous transportation.

In preferred embodiments of the present invention, the engaging device has a support portion, one end of the support portion is provided with a protrusion formed to engage the concavity formed in the preform, the other end of the support portion is fixed, and the one end of the support portion is urged outward.

Effects of the Invention

According to the transport apparatus of the present invention, the excellent effect can be exhibited that the preforms can be oriented in the same direction during continuous transportation.

MODE FOR CARRYING OUT THE INVENTION

A molding apparatus having a transport apparatus of the present invention will be described using FIG. 1.

Figure 1:
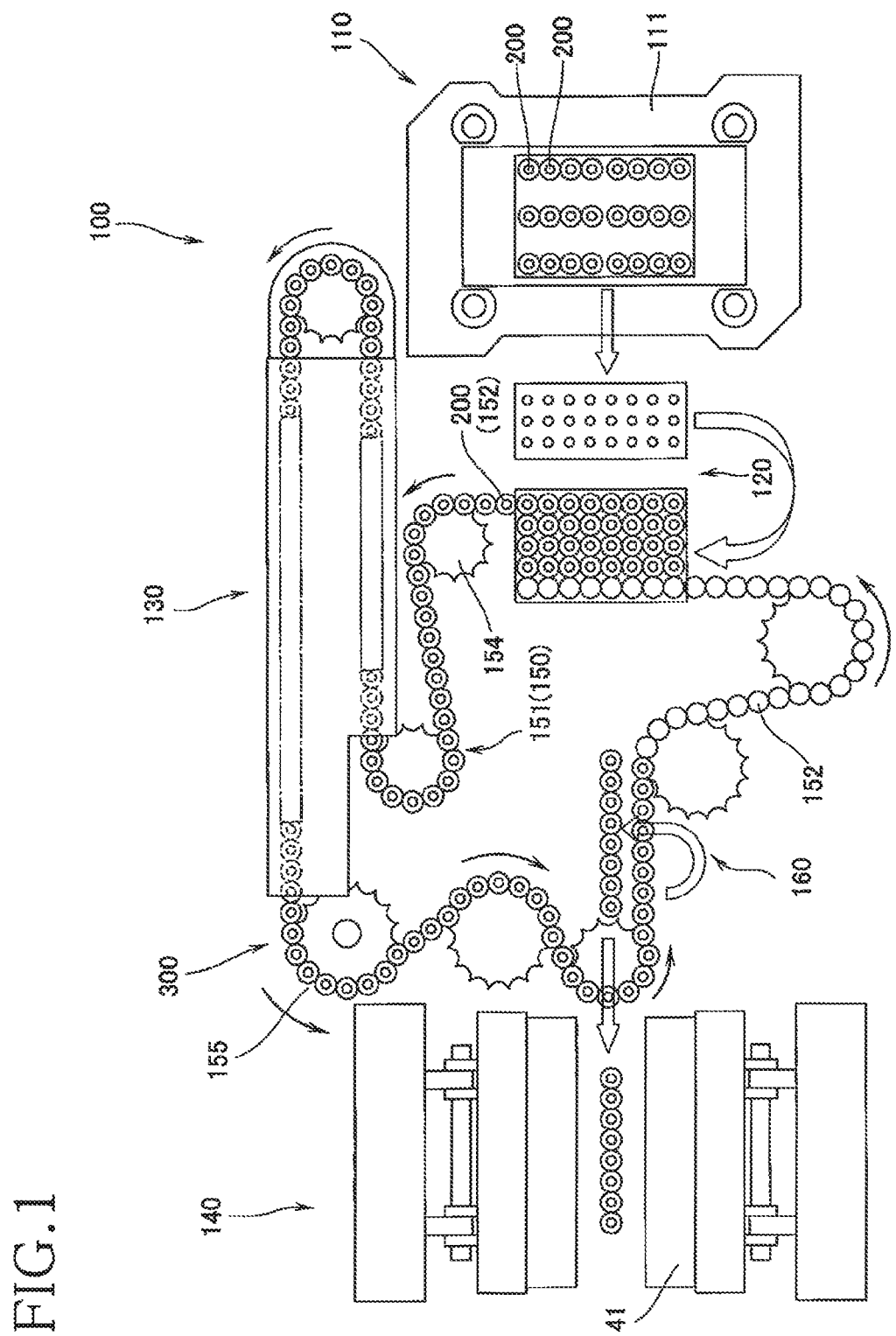
FIG. 1 is a schematic view showing a molding apparatus equipped with a transport apparatus according to an embodiment of the present invention.

As shown in FIG. 1, a molding apparatus 100 provided with the transport apparatus according to the present embodiment is equipped with an injection molding section 110 for injection molding preforms 200, which will become container bodies; a cooling section 120 for cooling the preforms 200 molded in the injection molding section 110; a heating section 130 for heating the preforms 200; and a blow molding section 140 for blow molding the preforms 200 arranged within blow cavity molds.

The molding apparatus 100 is also equipped with a transport section 150 including a transport line 151 constituting a loop-shaped transport line circulating from the cooling section 120 through the heating section 130 and the blow molding section 140. The transport section 150 transports the preform 200 from the cooling section 120 to the heating section 130, and also transports the preform 200, which has been heated in the heating section 130, to the blow molding section 140.

The molding apparatus 100 according to the present invention is characterized by a transport apparatus 300 in the transport section 150, and the configurations of the components will be described in detail below. Since the configurations of the injection molding section 110, the cooling section 120, the heating section 130, and the blow molding section 140 are publicly known, they will be explained here briefly. (If necessary, reference is requested, for example, to WO2013/027692, the international publication by the present applicant.)

The injection molding section 110 is equipped with a mold clamping mechanism 111, and clamps a core mold disposed above and a cavity mold disposed below by means of the mold clamping mechanism 111, although their illustrations are omitted. In the injection molding section 110, an injection space defined by the core mold and the cavity mold is charged with a resin material (raw material) by an injection device, whereby the preform 200 is injection molded. In the injection molding section 110, assume, for example, that up to 24 (3 rows×8/row) of the preforms 200 can be molded simultaneously. In the present embodiment, the preform 200 has a thickness varying in the diametrical direction, and a concavity 201 (see FIG. 2) is provided in its outer peripheral surface.

The cooling section 120 forcibly cools the injection molded preforms 200. The preforms 200 injection molded in the injection molding section 110 are transported from the injection molding section 110 to the cooling section 120 by a transport unit (not shown), and forcedly cooled in the cooling section 120. The preforms 200 cooled to a predetermined temperature in the cooling section 120 are carried out into the transport line 151 constituting the transport section 150, and transported continuously.

The preforms 200 are molded in an upright state with the neck facing upward in the injection molding section 110 and, in this state, are transported from the injection molding section 110 to the cooling section 120. The cooling section 120 has an inversion mechanism (not shown) for inverting the preforms 200, which have been transported in such an upright state, to bring them into an inverted state with the neck facing downward. During cooling in the cooling section 120, the preforms 200 are inverted by the inversion mechanism to enter an inverted state, and held by transport jigs 152 provided in the transport section 150.

The transport line 151 is constituted such that these transport jigs 152 are transported continuously and sequentially by the driving force of a sprocket 154, etc. Thus, the preforms 200 held by the transport jigs 152 are transported.

Below the cooling section 120, these transport jigs 152 are arranged in a plurality of rows. The transport jigs 152 holding the preforms 200 are carried out into the transport line 151. Then, the preforms 200 held by the transport jigs 152 are transported along the transport line 151 and carried into the heating section 130.

In the heating section 130, the preforms 200 cooled in the cooling section 120 are heated to a temperature suitable for stretching while the transport jigs 152 holding the preforms 200 are being moved along the transport line 151. In the present embodiment, the preforms 200 are heated, while being allowed to rotate on their own axes, within the heating section 130, whereby the preforms 200 are each heated uniformly as a whole.

After the preforms 200 are heated by the heating section 130 in the above manner, the transport line 151 has a curved transport portion 155, which is curved with a predetermined radius, on a side downstream of the heating section 130. The transport apparatus 300 is provided in correspondence with the curved transport portion 155. The transport apparatus 300, as will be described in detail later, is designed to set all the orientations of the preforms 200 during transportation to a predetermined orientation. Hence, the preforms 200 having passed through the curved transport portion 155 are all aligned in a state facing in a predetermined direction. Then, the transport jigs 152 holding the preforms 200 are transported from the curved transport portion 155 along the transport line 151, and carried into the blow molding section 140.

In a transfer section 160, the preforms 200, held in an inverted state, are inverted and taken out in an upright state, by predetermined numbers (for example, eights), by transfer arms (not shown). In the blow molding section 140, the predetermined number of the preforms 200 received from the transfer section 160 are transported to blow cavity molds 141 each composed of a pair of split molds, and the preforms 200 are blow molded in the blow cavity molds 141. In this case, with the present embodiment, the presence of the transport apparatus 300 to be described below makes it possible to align the orientations of the preforms with different thicknesses in the diametrical direction, thus enabling desired blow molding.

Figure 2:
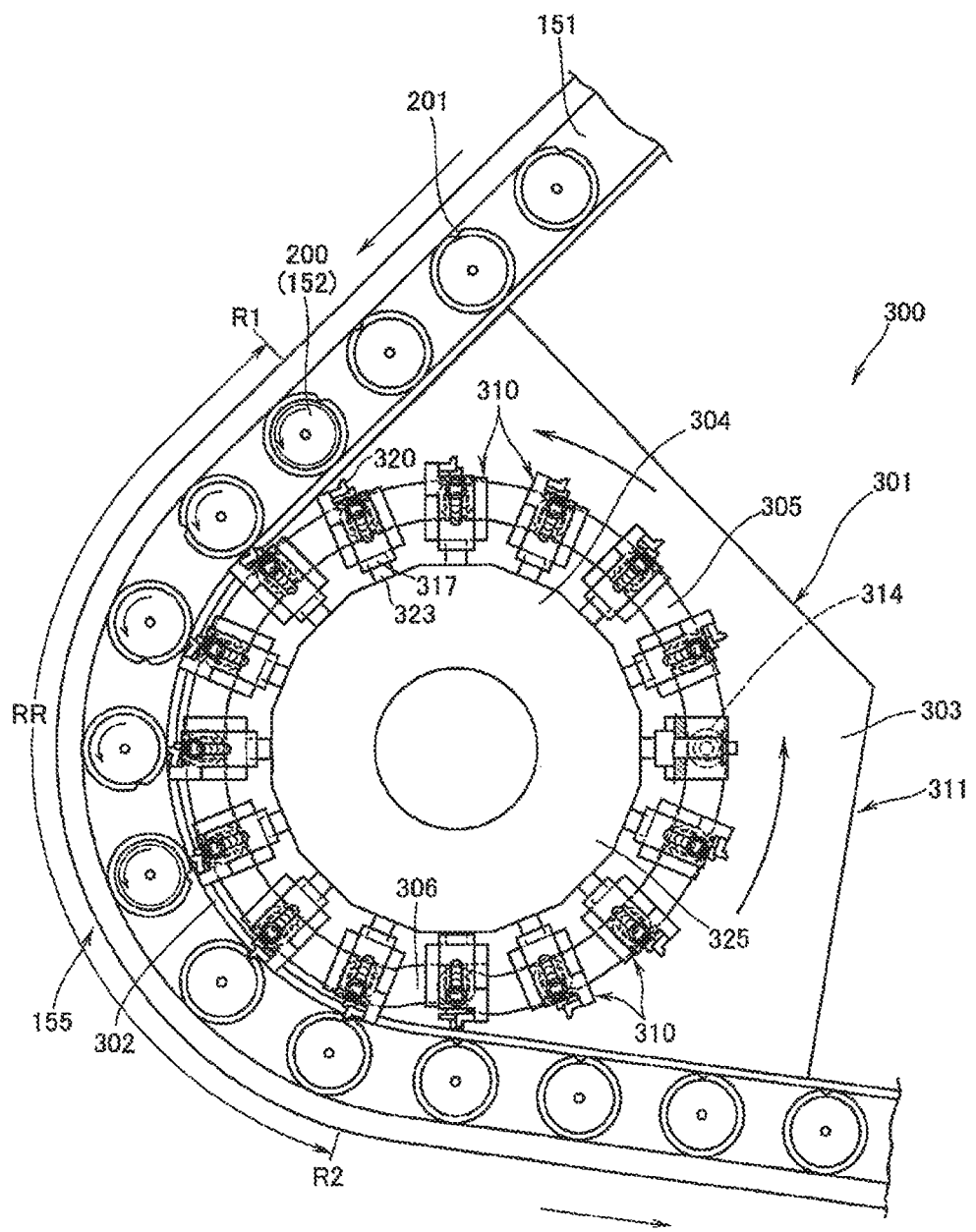
FIG. 2 is a schematic view for illustrating a transport state in the transport apparatus of the present embodiment.
Figure 3:
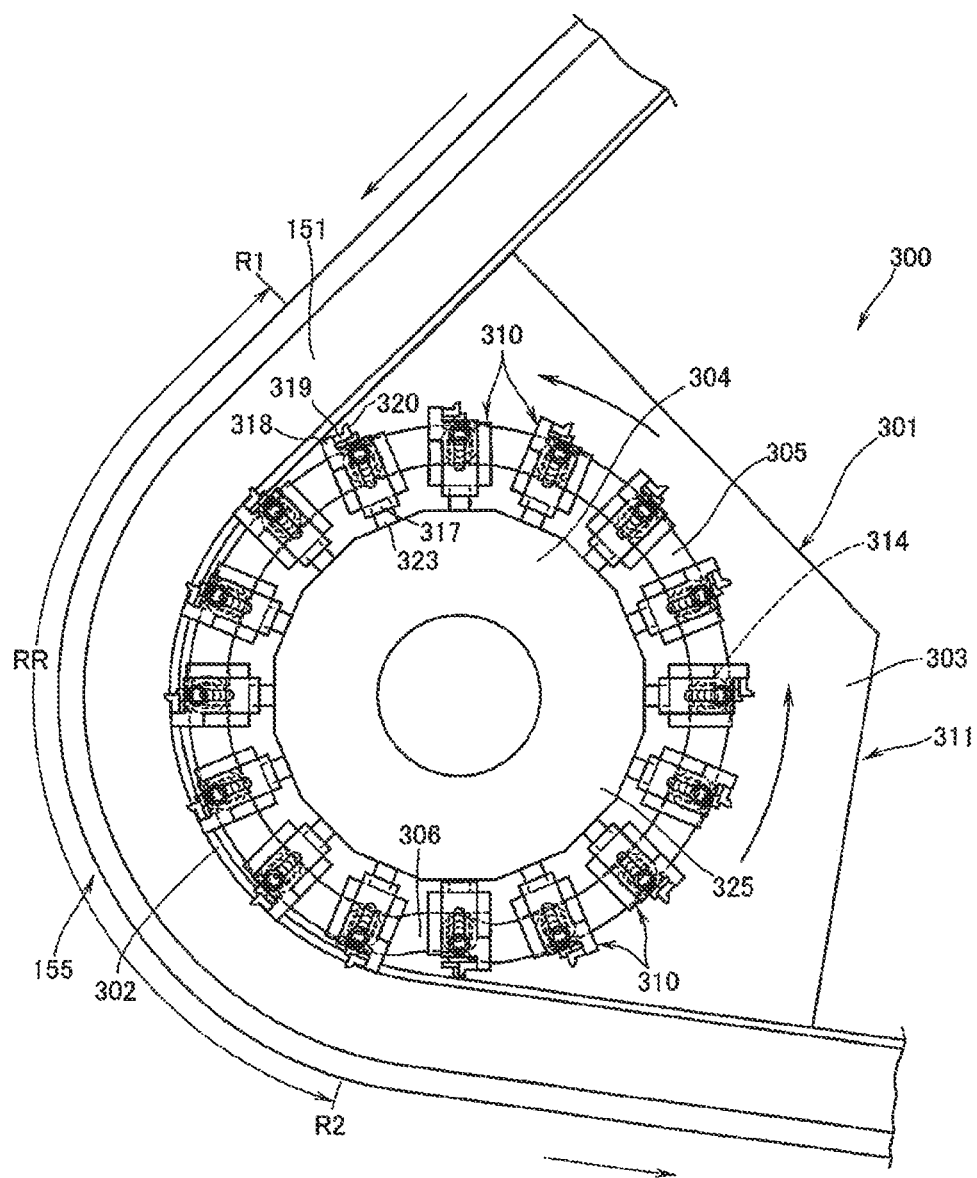
FIG. 3 is a schematic view for illustrating the transport state in the transport apparatus of the present embodiment.

The transport apparatus 300 in the present embodiment will be described using FIGS. 2 to 5. FIG. 2 is a partially enlarged view of a site near the curved transport portion shown in FIG. 1 for illustrating the transport apparatus. FIG. 3 is FIG. 2 from which the preforms have been eliminated for illustrating the transport apparatus.

The transport apparatus 300 provided in correspondence with the curved transport portion 155 is equipped with an engaging apparatus 301 for setting all of the orientations of the preforms 200, which are being transported, to a predetermined orientation. The engaging apparatus 301 has a plurality of engaging devices 310 which engage the preforms 200 being transported along the transport line 151, and set the orientations of the preforms 200 to the predetermined orientation. The transport apparatus 300 in the present invention is composed of such a transport line 151, a transport device that transports the transport jigs 152 on the transport line 151, and the plurality of engaging devices 310.

The engaging apparatus 301 has a pedestal portion 303 which is formed in correspondence with the curved transport portion 155 and which has a curved part 302 curved in correspondence with the curved part of the curved transport portion 155. A columnar portion 304 is provided in the pedestal portion 303. The columnar portion 304 is configured to be capable of rotating on its axis in the horizontal direction, with its center as the axial center. The direction of this rotation of the columnar portion 304 on the axis thereof is set to be the same as the transport direction. That is, this direction is counterclockwise in FIGS. 2, 3 and 5. To the columnar portion 304, the respective engaging devices 310 are fixed in a state in which they are separated from each other by a predetermined distance. Since the columnar portion 304 is of a polygonal shape, which can be a nearly circular shape, in a plan view, the respective engaging devices 310 can be said to be provided at a predetermined spacing in a circumferential direction.

Moreover, the pedestal portion 303 has a nearly circular groove part 305 formed in a plan view. The groove part 305 has a cam structure. As will be described in detail later, a rolling member 314 of the engaging device 310 is inserted into the groove part 305. The groove part 305 has, at a predetermined position, a retreat area 306 which is recessed toward the columnar portion 304, namely, inwardly.

Figure 4:
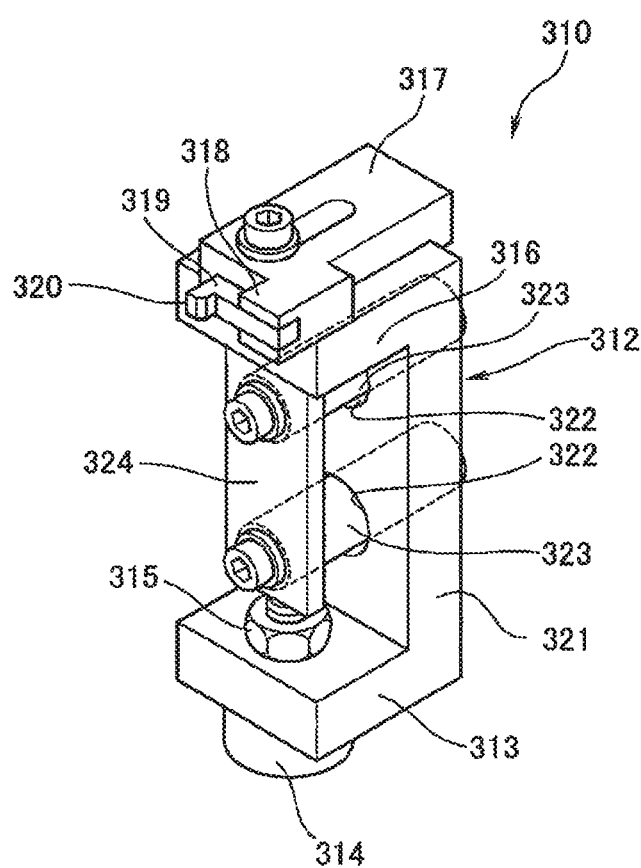
FIG. 4 is a schematic perspective view for illustrating an engaging portion constituting the transport apparatus of the present embodiment.

The engaging device 310 will be described using FIG. 4.

Each engaging device 310 has a first support portion 312. The first support portion 312 is a U-shaped member in a side view. In a bottom surface part 313 constituting the bottom surface of the first support portion 312, the rolling member 314 such as a cam follower is provided to extend vertically downwardly. The rolling member 314 is fastened in the bottom surface part 313 by a fastening member 315. The rolling member 314 is inserted into the groove part 305 (see FIG. 2) having the cam structure, as has been mentioned above.

A second support portion 317 is provided above an upper surface part 316 constituting the upper surface of the first support portion 312. An engaging portion 319 is provided at the leading end 318, beside the transport line 151 (see FIGS. 2, 3), of the second support portion 317. The engaging portion 319 is in a so-called cantilever state in which one end thereof is supported by the leading end 318, while the other end thereof is not supported. The other end of the engaging portion is urged outward (toward the side opposite to the second support portion 317).

The other end of the engaging portion 319 defines a protrusion 320 protruding toward the transport line 151 (see FIGS. 2, 3). The protrusion 320 is in a shape corresponding to the concavity 201 (see FIG. 2) as will be described later in detail. The protrusion 320 of the engaging portion 319 is configured to be associated with the transport line 151 in a region opposing the transport line 151 (see FIG. 3).

In each engaging device 310, two through-holes 322 are formed in a back surface part 321 constituting a part of the first support portion 312 between the bottom surface part 313 and the upper surface part 316, and two cylindrical portions 323 are provided to penetrate the through-holes 322. The base end side (at least one of the ends) of each cylindrical portion 323 is fixed to the columnar portion 304 (see FIGS. 2, 3), and a plate-shaped portion 324 spanning the cylindrical portions 323 is fixed to the leading end side of each cylindrical portion 323.

Returning to FIGS. 2, 3, the predetermined distance between the engaging device 310 provided on the columnar portion 304 agrees with the distance between the transport jigs 152, namely, the distance between the preforms 200.

The operating state of the transport apparatus 300 in the above configuration will be described below.

When the columnar portion 304 begins to rotate on its axis, with the center of the columnar portion 304 as the axial center (the direction of rotation on the axis is indicated by arrows in FIGS. 2, 3), each engaging device 310 moves along the groove part 305 in accordance with the rotation of the columnar portion 304 on its axis. This is because each engaging device 310 is fixed to the columnar portion 304 by the cylindrical portions 323, and the rolling member 314 is inserted into the groove part 305. That is, the groove part 305 functions as a guide groove for the engaging device 310. Since the groove part 305 has, at the predetermined position, the retreat area 306 recessed toward the columnar portion 304 (inwardly), the engaging 310, when coming to the retreat area 306, retreats inside along the shape of the retreat area 306. Past the retreat area 306, the engaging device 310 moves again along the nearly circular groove part 305.

The preform 200 to be transported in the transport direction (indicated by the arrows in FIGS. 2, 3) near the curved transport portion 155 will be described on the other hand. The transport speed of the preform 200 and the rotational speed of the columnar portion 304 agree with each other, and the distance between the preforms 200 and the distance between the engaging devices 310, in the curved part 302, are in agreement. In the curved part 302, therefore, the engaging device 310 and the preform 200 always move while opposing each other. Such movement of the preform 200 and that of the engaging device 310 are performed in matched timing.

Around the pedestal portion 303, the transport jig 152 rotates on its axis in the horizontal direction, with its center as the axial center, during transport. Concretely, for example, a sprocket provided in the transport jig 152 is fitted to a roller chain provided in the transport line 151, whereby the transport jig 152 rotates on its axis. Also, the preform 200 placed thereon rotates on its axis in accordance with the rotation of the transport jig 152 on the axis thereof. When the preform 200 engages the engaging device 310, the preform 200 does not rotate, but only the transport jig 152 rotates on its axis while being transported, as will be described later.

The position at which the rotation on one's own axis in the transport direction of the transport line 151 starts is designated as a self-rotation start position R1, while the position at which the rotation on one's own axis in the transport direction of the transport line 151 ends is designated as a self-rotation end position R2. A region ranging from the self-rotation start position R1 to the self-rotation end position R2 is designated as a self-rotation region RR. In the present embodiment, the self-rotation region RR terminates upstream, in the transport direction, of the position opposing the retreat area 306. In the above configuration, for example, in which the sprocket provided in the transport jig 152 is fitted to the roller chain provided in the transport line 151, whereby the transport jig 152 rotates on its axis, it follows that the roller chain is provided throughout the self-rotation region RR. The self-rotation region RR is set such that the preform 200 can make at least one rotation from the self-rotation start position R1 until the self-rotation end position R2, unless the preform 200 engages the engaging device 310.

As shown in FIG. 2, when the preform 200 is transported to a site near the curved transport portion 155, the positions of the concavities 201 face in different directions (unaligned state), and the orientations of the preforms 200 are certainly nonuniform. In such a state, the preforms 200 are transported, and flow into the self-rotation region RR. In the self-rotation region RR, the preform 200 is transported while being allowed to rotate on its axis. While the preform 200 is being transported in the transport line 151 while being caused to rotate on its axis, in the manner mentioned above, the protrusion 320 of the engaging device 310 is fitted into the concavity 201 provided in the preform 200. Upon fitting of the protrusion 320 into the concavity 201, only the transport jig 152 rotates on its axis, as mentioned above, and the rotation of the preform 200 stops because of the fitting.

When the preform 200 is carried out of the self-rotation region RR, the engaging device 310 retreats into the retreat area 306 at the same time. Thus, the engaging portion 319, i.e. the protrusion 320, disengages from the preform 200, and the preform 200 is transported in this state. That is, the preforms 200 located downstream, in the transport direction, of the position corresponding to the retreat area 306 are all transported, with the concavities 201 being aligned in the same orientation (aligned state).

Figure 5:
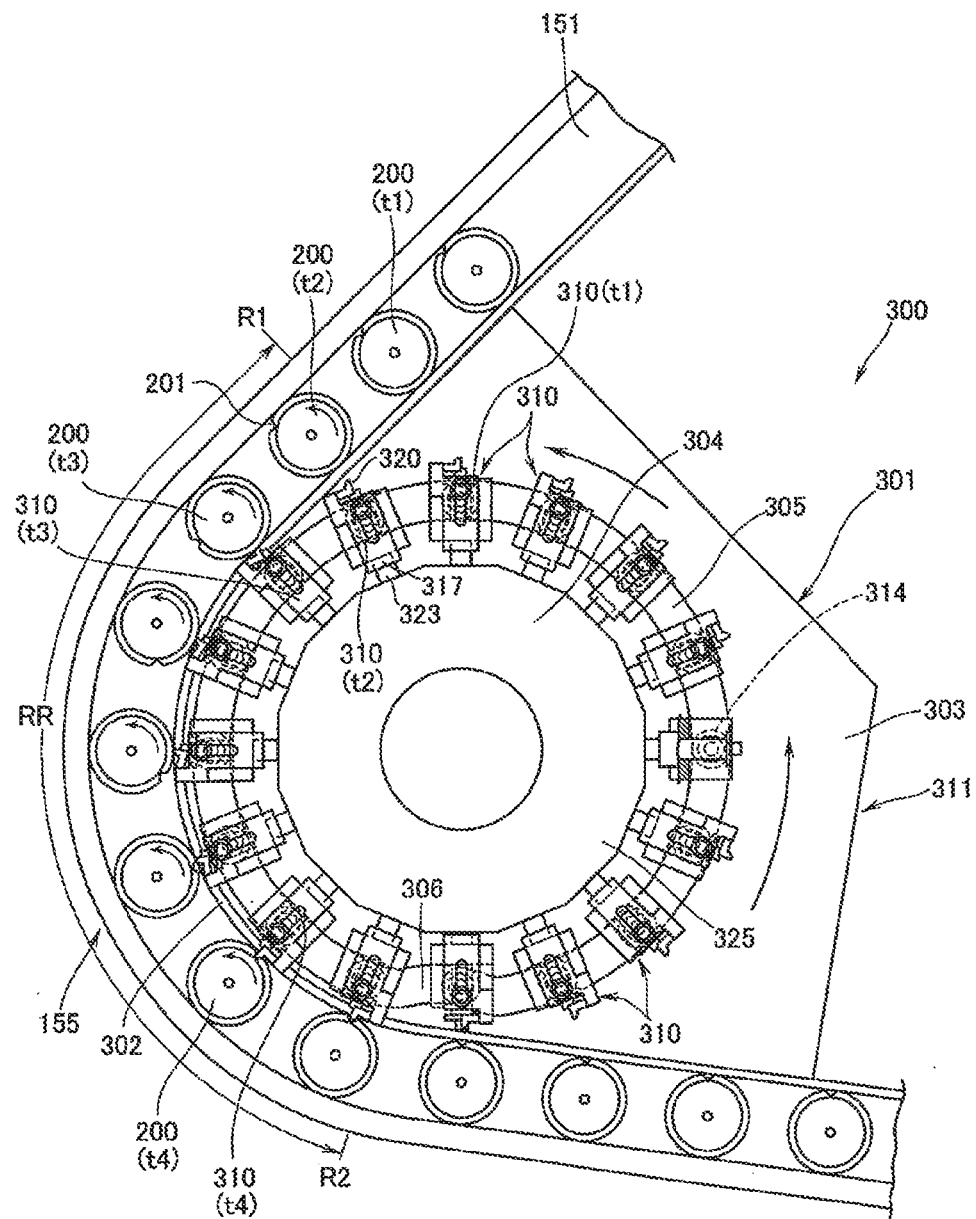
FIG. 5 is a schematic view for illustrating the transport state using the transport apparatus of the present embodiment.

In this connection, a further concrete explanation will be presented using FIG. 5. FIG. 5 shows the transport state of the single preform 200 in the curved transport portion 155, and shows the transport position of the preform 200 at each elapsed time, and the single engaging device 310 opposing and engaging the preform 200. In detail, FIG. 5 describes a plurality of the preforms 200 and a plurality of the engaging device 310, but all of them represent the same preform 200 and the same engaging device 310 at their respective positions at respective elapsed times.

As stated above, the preform 200 is transported to the curved transport portion 155 from its upstream side. In harmony with the transport of the preform 200, the engaging device 310 is also moved along the groove part 305. At a time t1, the preform 200 is transported to a site immediately in front of the self-rotation start position R1 of the curved transport portion 155. The preform 200(t1) at the time t1 has the concavity 201 facing outward. In this case, the engaging device 310(t1) does not yet oppose the preform 200(t1).

When the preform 200 arrives at the self-rotation start position R1, the transport jig 152 (see FIG. 2) begins to rotate on its axis, beginning at the self-rotation start position R1, so that the preform 200 also begins to rotate on its axis. The direction of the rotation on the axis is the direction indicated by the arrow. In the self-rotation region RR, the preform 200 is transported while rotating on its axis. The preform 200(t2) at a time t2 in the vicinity of the self-rotation start position R1 does not yet oppose the engaging device 310(t2) at this point in time.

The preform 200 is further transported and, at a time t3, the preform 200(t2) opposes the engaging device 310(t3). In this case, the protrusion 320 of the engaging device 310 is not in engagement with the concavity 201 of the preform 200(t3), and is thus pressed by the preform 200(t3) and remains retracted.

Then, the preform 200(t3) continues to rotate on its axis while being transported. The engaging device 310(t3), keeping opposed to this preform 200, moves, with the protrusion 320 being pressed by the preform 200. At a time t4, the concavity 201 of the preform 200(t4) faces completely inward, and engages the protrusion 320 of the engaging device 310(t4).

That is, in the present embodiment, the preform 200 rotates on its axis in the self-rotation region RR. Consequently, no matter which position the preform 200 faces when reaching the curved transport portion 155 during transport, the concavity 201 of the preform 200 engages the engaging portion 319 of the engaging device 310, without fail.

Since the engaging device 310 moves along the groove part 305, the engaging device 310, at the time t4, retreats in the retreat area 306. As a result, the engaging portion 319 of the engaging device 310 separates from the concavity 201 of the preform 200 being transported, thus completing the engagement. In this case, the preform 200 being transported simultaneously can be transported, with its orientation being unchanged.

Should the groove part 305 lack the retreat area 306, the protrusion 320 is caught in the concavity 201 of the preform 200 when the protrusion 320 separates from the concavity 201. As a result, the preform 200 rotates, and the orientation of the preform 200 changes. In this case, it is difficult to align the orientations of the preforms 200, which have passed through the curved transport portion 155, with the same direction, as shown in FIG. 2. Thus, it is desirable that the retreat area 306 be formed in the groove part 305 to prevent the protrusion 320 from getting snagged when it disengages from the concavity 201, as in the present embodiment.

In this manner, the preforms 200 finishing the engagement are transported with their orientations being aligned.

In the present embodiment, the preforms 200 are transported, with their orientations being aligned, as described above. Thus, when the preforms 200 are carried into the blow molding section 140, too, their orientations are in alignment. Consequently, even if the shape of the preform 200 is not uniform in the diametrical direction of the preform 200, for example, even in the case of an elliptical shape or a nonuniform thickness, the orientations of all the preforms 200 are aligned, so that the preforms 200 can be subjected to desired blow molding in the blow molding section 140.

In the present embodiment, moreover, the engaging portion 319 has one end supported by the leading end 318, and has the other end urged outward without being supported. Thus, the engaging portion 319 easily engages the concavity 201 of the preform 200.

According to the foregoing transport apparatus 300, the orientation of each preform 200 can be aligned with the same orientation during continuous transport.

The present invention is not limited to the above-described embodiment. In the present embodiment, for example, the curved transport portion 155 is provided between the heating section 130 and the blow molding section 140, but the arrangement of the curved transport portion 155 is not limited thereto. For example, the curved transport portion 155 may be provided ahead of the heating section 130.

The present embodiment illustrates the configuration in which the protrusion 320 of the engaging device 310 engages the concavity 201 formed in the preform 200, but the configuration for engagement of the engaging device 310 with the preform 200 is not limited. For example, a convexity may be formed in the preform 200, and this convexity may be pressed against a convexity formed in the engaging portion 319 to perform engagement.

In the present embodiment, an explanation is offered for the example in which the transport apparatus 300 continuously transports only the preforms 200. However, the configuration of the transport apparatus is not limited thereto. In forming handle-equipped containers, for example, the transport apparatus may be configured to alternately transport preforms and handles for bottles.

EXPLANATIONS OF LETTERS OR NUMERALS

100 Molding apparatus
110 Injection molding section
111 Mold clamping mechanism
120 Cooling section
130 Heating section
140 Blow molding section
141 Blow cavity mold
150 Transport section
151 Transport line
152 Transport jig
154 Sprocket
155 Curved transport portion
200 Preform
201 Concavity
300 Transport apparatus
301 Engaging apparatus
302 Curved part
303 Pedestal portion
304 Columnar portion
305 Groove part
306 Retreat area
310 Engaging device
312 First support portion
313 Bottom surface part
314 Rolling member
315 Fastening member
316 Upper surface part
317 Second support portion
318 Leading end
319 Engaging portion
320 Protrusion
321 Back surface part
322 Through-hole
323 Cylindrical portion
324 Plate-shaped portion
R1 Self-rotation start position
R2 Self-rotation end position
RR Self-rotation region

The invention claimed is:

1. A transport apparatus for transporting a preform for blow molding, comprising:
a transporter having transport jigs, each of the transport jigs for holding one preform of a plurality of preforms in an inverted state with a neck of each of the preforms facing downward, and which transporter continuously transports the preforms at a transport speed along a transport line in a horizontal direction along with the transport jigs while rotating the transport jigs and allowing each of the preforms to rotate about its own vertical axis with rotation of the transport jigs; and
an engaging device comprising an engager provided so as to be movable along the transport line in conformity with the transport speed of each of the preforms by the transporter, and the engager provided so as to engage a convexity or a concavity provided in an outer periphery of each of the preforms with the preforms moving to stop the rotation of each of the preforms about the axis thereof, thereby setting an orientation of each of the preforms to a predetermined orientation,
wherein the transport line is provided with a curved transport portion which is curved with a predetermined radius, and
the engager is provided rotatably along the curved transport portion radially inwardly of the curved transport portion.

2. The transport apparatus according to claim 1, wherein a path of rotation of the engager has a radius set to follow the curved transport portion.

3. The transport apparatus according to claim 1, wherein the engaging device has a rolling member,
the rolling member is configured to move in a groove part formed in the transport apparatus, and
the groove part has, at a predetermined position, a retreat area formed so that a relative distance between the engaging device and the preform lengthens.

4. The transport apparatus according to claim 2, wherein the engager has a rolling member,
the rolling member is configured to move in a groove part formed in the transport apparatus, and
the groove part has, at a predetermined position, a retreat area formed so that a relative distance between the engager and the preform lengthens.

5. The transport apparatus according to claim 1, wherein the engager has a support portion,
one end of the support portion is provided with a protrusion formed to engage the concavity formed in the preform,
another end of the support portion is fixed, and
the one end of the support portion is urged outward.

6. The transport apparatus according to claim 2, wherein the engager has a support portion,
one end of the support portion is provided with a protrusion formed to engage the concavity formed in the preform,
another end of the support portion is fixed, and
the one end of the support portion is urged outward.

7. The transport apparatus according to claim 3, wherein the engager has a support portion, one end of the support portion is provided with a protrusion formed to engage the concavity formed in the preform,
another end of the support portion is fixed, and
the one end of the support portion is urged outward.

8. The transport apparatus according to claim 4, wherein the engager has a support portion,
one end of the support portion is provided with a protrusion formed to engage the concavity formed in the preform,
another end of the support portion is fixed, and
the one end of the support portion is urged outward.

* * * * *